(12) United States Patent
Wang

(10) Patent No.: US 8,923,335 B2
(45) Date of Patent: *Dec. 30, 2014

(54) METHOD AND APPARATUS FOR BINDING REDUNDANCY VERSIONS WITH A SYSTEM FRAME NUMBER AND SUBFRAME NUMBERS

(75) Inventor: Fan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 415 days.

This patent is subject to a terminal disclaimer.

(21) Appl. No.: 13/053,440

(22) Filed: Mar. 22, 2011

(65) Prior Publication Data

US 2011/0211592 A1    Sep. 1, 2011

Related U.S. Application Data

(63) Continuation of application No. PCT/CN2009/073206, filed on Aug. 12, 2009.

(30) Foreign Application Priority Data

Sep. 22, 2008   (CN) .......................... 2008 1 0161802

(51) Int. Cl.
*H04J 3/24* (2006.01)
*H04L 1/18* (2006.01)

(52) U.S. Cl.
CPC ............ *H04L 1/1819* (2013.01); *H04L 1/1887* (2013.01)
USPC ........................................................ 370/474

(58) Field of Classification Search
None
See application file for complete search history.

(56) References Cited

U.S. PATENT DOCUMENTS

| 7,249,303 | B2 | 7/2007 | Döttling et al. | |
| 2005/0076283 | A1 | 4/2005 | Malkamaki et al. | |
| 2005/0250454 | A1 | 11/2005 | Sebire et al. | |
| 2008/0056229 | A1 | 3/2008 | Gholmieh et al. | |
| 2009/0327828 | A1 | 12/2009 | Ojala et al. | |
| 2010/0034139 | A1 | 2/2010 | Love et al. | |
| 2010/0080152 | A1* | 4/2010 | Lindh et al. | 370/280 |
| 2010/0322169 | A1* | 12/2010 | Narasimha | 370/329 |

FOREIGN PATENT DOCUMENTS

| CN | 1965521 A | 5/2007 |
| CN | 1983916 A | 6/2007 |
| CN | 101192878 A | 6/2008 |
| JP | 2010041718 A | 2/2010 |

OTHER PUBLICATIONS

3GPP TSG RAN WG 1 #52, R1-081009, "RV Selection for uplink HARQ", Sorrento, Italy, Feb. 2008, 4 pages.*

(Continued)

*Primary Examiner* — Minh-Trang Nguyen
(74) *Attorney, Agent, or Firm* — Leydig, Voit & Mayer, Ltd.

(57) ABSTRACT

A method and apparatus for binding Redundancy Versions (RVs) with a System Frame Number (SFN) and subframe numbers are disclosed. The method includes: choosing any 5 continuous subframes within a transmission window of a System Information (SI-x) message according to the subframe numbers of an SFN, and binding the SFN and subframe numbers of the 5 continuous subframes with RVs of the SI-x message. Because RVs are bound with an SFN and subframe numbers, when a transmission window of an SI-x message is longer than or equal to 5 ms, system frames and subframes are bound with RVs of the SI-x message so that the RV retransmission of the SI-x message is guaranteed.

36 Claims, 4 Drawing Sheets s201 — Choose any 5 continuous subframes according to subframe numbers of an SFN s202 — Bind the SFN and subframe numbers of the 5 continuous subframes with RVs of the SI-x message

(56) References Cited

OTHER PUBLICATIONS

Office Action in corresponding European Patent Application No. 09768486.4 (Jul. 17, 2012).
"R1-083717—Implicit RV Determination for BCCH," 3GPP TSG RAN WG1 #54bis Meeting, Sep. 29-Oct. 3, 2008, 3GPP, Valbonne, France.
"R1-083207—DCI Format 1C with Implicit RV and TBS," 3GPP TSG RAN #54, Aug. 18-22, 2008, 3GPP, Valbonne, France.
U.S. Appl. No. 12/771,972, filed Jan. 6, 2012.
Written Opinion of the International Searching Authority in corresponding PCT Application No. PCT/CN2009/073206 (Nov. 9, 2009).
Search Report in corresponding Chinese Patent Application No. 201110067799.2 (Nov. 27, 2012).
Office Action in corresponding Japanese Patent Application No. 2011-527189 (Dec. 11, 2012).
International Search Report in corresponding PCT Application No. PCT/CN2009/073206 (Nov. 19, 2009).
Extended European Search Report in corresponding European Application No. 09768486.4 (Nov. 19, 2010).
"3GPP TS 25.308—High Speed Downlink Packet Access (HSDPA); Overall description; Stage 2 (Release 8)," May 31, 2008, Version 8.2.0, $3^{rd}$ Generation Partnership Project, Valbonne, France.
Notice of Allowance in corresponding Japanese Patent Application No. 2011-527189 (Apr. 9, 2013).
"LS on PDCCH DCI format 1C," 3GPP TSG RAN WG1 Meeting #54, Jeju, Korea, R1-083416, $3^{rd}$ Generation Partnership Project, Valbonne, France (Aug. 18-22, 2008).
"RV selection for uplink HARQ," 3GPP TSG RAN WG1 #51bis, Sevilla, Spain, R1-080252, $3^{rd}$ Generation Partnership Project, Valbonne, France (Jan. 14-18, 2008).
"Way forward on RV usage for uplink HARQ," 3GPP TSG-RAN Working Group 1 #52, Sorrento, Italy, TDOC R1-080946, $3^{rd}$ Generation Partnership Project, Valbonne, France (Feb. 11-15, 2008).

* cited by examiner

METHOD AND APPARATUS FOR BINDING REDUNDANCY VERSIONS WITH A SYSTEM FRAME NUMBER AND SUBFRAME NUMBERS

CROSS-REFERENCE TO RELATED APPLICATIONS

This application is a continuation of International Application No. PCT/CN2009/073206, filed on Aug. 12, 2009, which claims priority to Chinese Patent Application No. 200810161802.5, filed on Sep. 22, 2008, both of which are hereby incorporated by reference in their entireties. In addition, U.S. Pat. No. 7,801,037 B2, issued on Sep. 21, 2010, is also a continuation of International Application No. PCT/CN2009/073206.

FIELD OF THE INVENTION

The present invention relates to communications, and in particular, to a method and apparatus for binding redundancy versions with a system frame number and subframe numbers.

BACKGROUND OF THE INVENTION

In the conventional art, Downlink Control Indicator (DCI) format 1C is used to schedule Paging Channel (PCH), Random Access Channel (RACH) responses message and Broadcast Channel (BCCH) message (SIB1 and SI-x, x=2, ..., 8). In the conventional art, the following definitions are given:

Redundancy Version (RV): 0 bit long, i.e., implicit indication.

The RVs of System Information Block 1 (SIB1) are bound with a System Frame Number (SFN) and subframe numbers, and different RVs are used in an 80 ms. The RV sequence of SIB1 is RV0, RV2, RV3, and RV1. The RVs of System Information x (SI-x) are bound with an SFN and subframe numbers as well.

According to the conventional art, the duration of each system frame is 10 ms, and the system frames are numbered from 0. One system frame contains 10 subframes, which are numbered from 0 to 9. The relationship in time sequence of system frames and subframes is shown in FIG. 1.

Within an 80-ms cycle, there are 8 system frames, in which SIB1 is transmitted on subframe numbered 5 of each system frame having an even SFN. The RV sequence of SIB1 is 0, 2, 3, 1. SI-x is transmitted within a specified transmission window, the length of which may be {1, 2, 5, 10, 20, 40} ms. Each SI-x message is transmitted with a certain number of retransmissions within the transmission window. Each retransmission is done on one subframe and the transmission window of every SI-x message is close to each other but cannot overlap. The transmission window of SI-x can overlap with the transmission window of SIB1 but an SI-x message cannot be transmitted on a subframe where SIB1 is transmitted.

In the conventional art, there is no solution for binding the RVs of SI-x with an SFN and subframe numbers and as a result, the performance of SI-x message retransmissions cannot be guaranteed. Therefore, it is necessary to make improvement to the conventional art.

SUMMARY OF THE INVENTION

Aspects of the present invention provide a method and apparatus for binding Redundancy Versions (RVs) with a System Frame Number (SFN) and subframe numbers so as to guarantee the retransmission of System Information (SI-x) messages.

According to an aspect of the present invention, a method for binding RVs with an SFN and subframe numbers is provided, which may comprise: choosing any 5 continuous subframes within a transmission window of an SI-x message according to subframe numbers of an SFN; and binding the SFN and subframe numbers of the 5 continuous subframes with RVs of the SI-x message.

According to another aspect of the present invention, an apparatus for binding RVs with an SFN and subframe numbers is provided, which may include: a subframe choosing unit, configured to choose any 5 continuous subframes within a transmission window of an SI-x message according to subframe numbers of an SFN, and a binding unit, configured to bind the SFN and subframe numbers of the 5 continuous subframes with RVs of the SI-x message.

Compared to the conventional art, the present invention provides the following benefit:

Because RVs are bound with an SFN and subframe numbers, when the transmission window of SI-x message is longer than or equal to 5 ms, system frames and subframes are bound with RVs of the SI-x message so that the RV retransmission of the SI-x message is guaranteed.

DETAILED DESCRIPTION OF THE INVENTION

The present invention is described in detail with reference to the accompanying drawings and specific embodiments hereunder.

Figure 1:
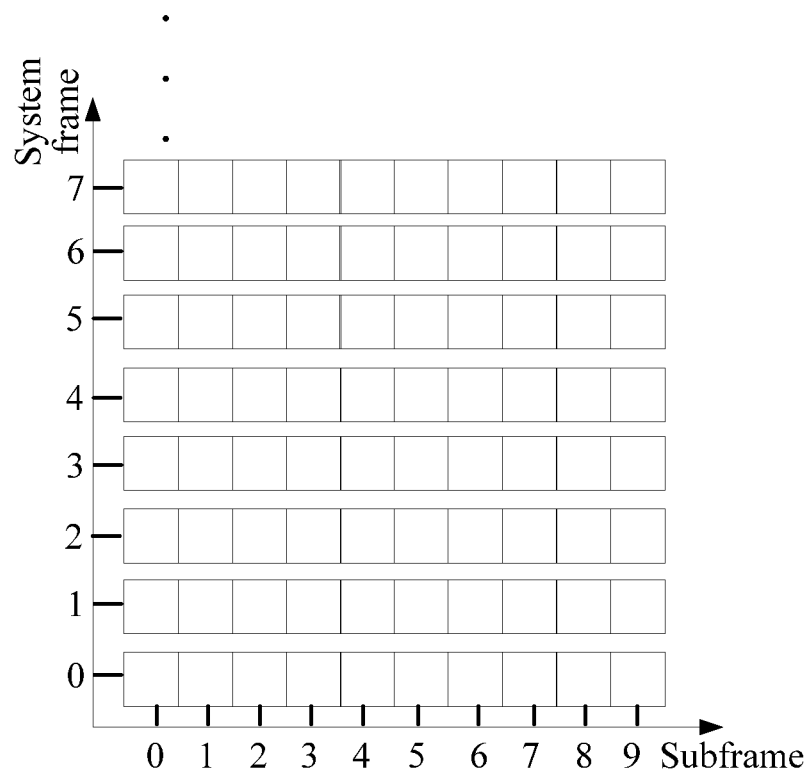
FIG. 1 shows the time sequence of system frames and subframes in the conventional art.
Figure 2:
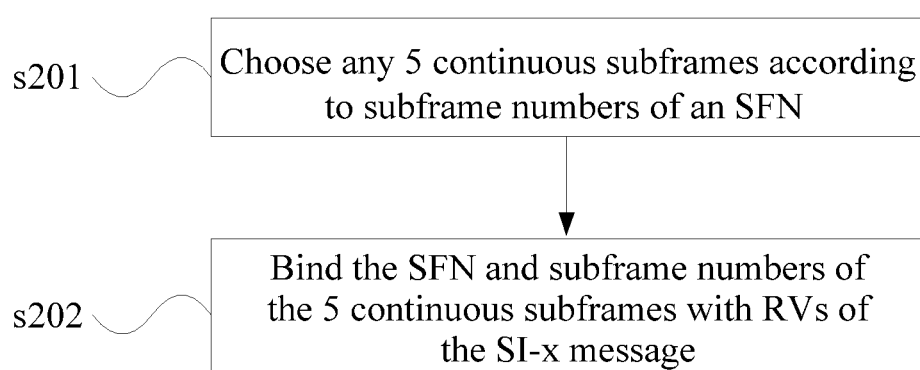
FIG. 2 shows a flowchart of a method for binding RVs with an SFN and subframe numbers according to an embodiment of the present invention.

FIG. 2 shows a method for binding RVs with an SFN and subframe numbers according to an embodiment of the present invention. The method includes the following steps:

Step s201: Any 5 continuous subframes are chosen according to subframe numbers of an SFN.

In this step, the choice is made within a transmission window of an SI-x message.

Step s202: RVs of the SI-x message is bound with the SFN and subframe numbers of the 5 continuous subframes.

In this step, RVs of the SI-x message are set for the 5 continuous subframes, and thus the RVs of the SI-x message are bound with the SFN and subframe numbers.

With the method provided according to the above embodiment, the RVs are bound with the SFN and subframe numbers. When a transmission window of an SI-x message is longer than or equal to 5 subframes, the performance of RV retransmission of the SI-x message is assured.

The present invention will be explained in detail with specific application scenarios.

Another embodiment of the present invention provides a method for binding RVs with an SFN and subframe numbers. In the embodiment, an RV sequence of an SI-x message during retransmission is set as $S_{RV}=\{S_{RV}(0), S_{RV}(1), S_{RV}(2), S_{RV}(3)\}$, where $S_{RV}=\{S_{RV}(0), S_{RV}(1), S_{RV}(2), S_{RV}(3)\}=\{0, 2, 3, 1\}$.

Those skilled in the art understand that an RV sequence of an SI-x message during retransmission may take other sequences.

Figure 3:
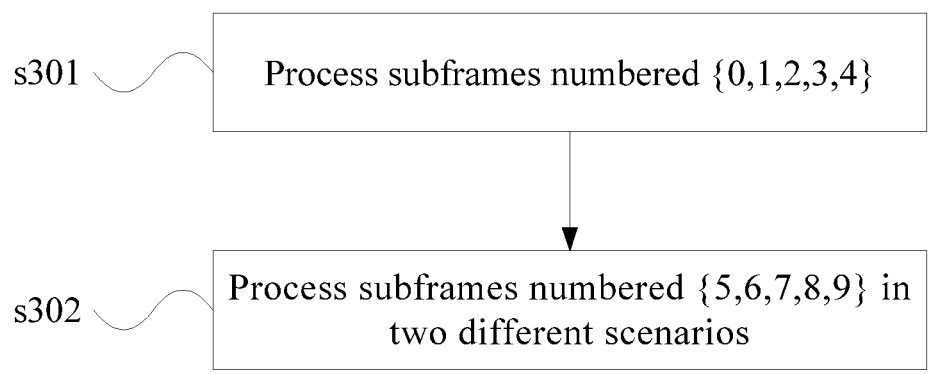
FIG. 3 shows a flowchart of a method for binding RVs with an SFN and subframe numbers according to another embodiment of the present invention.

Specifically, as shown in FIG. 3, with respect to 5 continuous subframes beginning with a subframe numbered 0 or 5, the binding method includes the following steps:

Step s301: For subframes numbered $\{0, 1, 2, 3, 4\}$, 4 subframes are chosen from said 5 subframes and the 4 subframes are in a time sequence. An RV sequence of the 4 subframes is set as $S_{RV}(0), S_{RV}(1), S_{RV}(2), S_{RV}(3)$, and the RV of the remaining subframe in the 5 subframes is set as a value in $S_{RV}=\{S_{RV}(0), S_{RV}(1), S_{RV}(2), S_{RV}(3)\}$.

Step s302: For subframes numbered $\{5, 6, 7, 8, 9\}$, the processing depends on specific scenarios.

In a scenario of system frames with even SFNs (SFN=0, 2, 4 . . . ), for subframes numbered $\{6, 7, 8, 9\}$, an RV sequence of the subframes is set as $S_{RV}(0), S_{RV}(1), S_{RV}(2), S_{RV}(3)$.

Preferably, RVs of subframes numbered 5 may be set as $S_{RV}=(\lfloor(n_f \mod 8)/2\rfloor)$, wherein $n_f$ stands for the SFN.

This will assure that a RV sequence of SIB1 is $S_{RV}(0), S_{RV}(1), S_{RV}(2), S_{RV}(3)$.

In a scenario of system frames with odd SFNs (SFN=1, 3, 5 . . . ), 4 subframes that are in a time sequence are chosen from subframes numbered $\{5, 6, 7, 8, 9\}$. An RV sequence of the 4 subframes is set as $S_{RV}(0), S_{RV}(1), S_{RV}(2), S_{RV}(3)$, and RVs of the remaining ones in subframes numbered $\{5, 6, 7, 8, 9\}$ are set as any value in $S_{RV}=\{S_{RV}(0), S_{RV}(1), S_{RV}(2), S_{RV}(3)\}$.

With the method provided according to the above embodiment, RVs are bound with the SFN and subframe numbers. When a transmission window of an SI-x message is longer than or equal to 5 ms, 4 time-sequenced subframes whose RVs are arranged in a certain order can be found in any transmission window so that the performance of retransmission for SI-x message is assured.

Those skilled in the art can understand that it is unnecessary to use 5 continuous subframes beginning with a subframe numbered N as a group for binding RVs with an SFN and subframe numbers, wherein N is 0 or 5. The subframe number N may be an integer between 0 and 9. Or, in certain scenarios, RVs of an SI-x message may be bound by subframes one by one.

When N is not 0 and 5>N−1, a value in $S_{RV}=\{S_{RV}(0), S_{RV}(1), S_{RV}(2), S_{RV}(3)\}$ may be set randomly as the RV of subframes numbered 0 to N−1 of system frame numbered 0.

When N is not 0 and 5≤N−1, the RV of a subframe numbered 5 is SRV(0) and a value in $S_{RV}=\{S_{RV}(0), S_{RV}(1), S_{RV}(2), S_{RV}(3)\}$ is set randomly as the RV of subframes numbered 0 to 4 and 6 to N−1.

The RV binding of system frames is continuous and not repeated. From the beginning subframe numbered N of system frame numbered 0, every 5 subframes are bound continuously without repetition.

The present invention will be further explained with an exemplary embodiment where a transmission window of an SI-x message is 5 ms.

Figure 4:
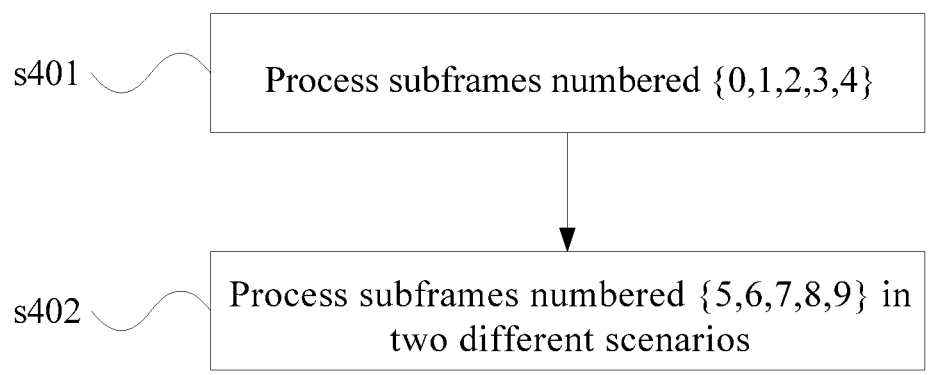
FIG. 4 shows a flowchart of a method for binding RVs with an SFN and subframe numbers according to still another embodiment of the present invention.

Still in another embodiment of the present invention a method for binding RVs and an SFN and subframe numbers is provided. As shown in FIG. 4, with respect to 5 continuous subframes beginning with subframe numbered 0 or 5, the binding method includes following steps:

Step s401: For subframes numbered $\{0, 1, 2, 3, 4\}$, subframes numbered 0, 1, 2 and 3 are chosen. An RV sequence of subframes numbered 0, 1, 2 and 3 is set as $S_{RV}(0), S_{RV}(1), S_{RV}(2), S_{RV}(3)$, and an RV of a subframe numbered 4 is set as $S_{RV}((\lfloor=3+2*n_f+(n_f \mod 8)/2\rfloor) \mod 4)$, wherein $n_f$ stands for the SFN.

Thus, among 5 continuous subframes beginning with a subframe numbered 0, 4 time-sequenced subframes can be found with a RV sequence as $S_{RV}(0), S_{RV}(1), S_{RV}(2), S_{RV}(3)$. An enhanced NodeB (eNB) may schedule these subframes to retransmit SI-x messages. Because of the difference in RVs, the performance of retransmission is improved.

Step s402: For subframes numbered $\{5, 6, 7, 8, 9\}$, the processing depends on specific scenarios:

In a scenario of system frames with even SFNs (SFN=0, 2, 4 . . . ), for subframes numbered $\{6, 7, 8, 9\}$, an RV sequence of subframes numbered $\{6, 7, 8, 9\}$ as $S_{RV}(0), S_{RV}(1), S_{RV}(2), S_{RV}(3)$.

Thus, among 5 continuous subframes of a system frame with even SFN beginning with a subframe numbered 5, 4 time-sequenced subframes can be found with an RV sequence as $S_{RV}(0), S_{RV}(1), S_{RV}(2), S_{RV}(3)$. An eNB may schedule these subframes to retransmit SI-x messages. Because of the difference in RVs, the performance of retransmission is improved.

Further, RVs of subframes numbered 5 may be set as $S_{RV}=(\lfloor(n_f \mod 8)/2\rfloor)$, wherein $n_f$ stands for the SFN.

Thus, within an 80-ms cycle, an RV sequence of subframes numbered 5 of system frames with even SFNs in 8 system frames is $S_{RV}(0), S_{RV}(1), S_{RV}(2), S_{RV}(3)$. This guarantees available resources for scheduling in an eNB for SIB1 transmission.

In a scenario of system frames with odd SFNs (SFN=1, 3, 5 . . . ), subframes numbered 6, 7, 8 and 9 are chosen from subframes numbered $\{5, 6, 7, 8, 9\}$, an RV sequence of the subframes numbered 6, 7, 8 and 9 is set as $S_{RV}(0), S_{RV}(1), S_{RV}(2), S_{RV}(3)$ and RVs of remaining subframes numbered 5 are set as $S_{RV}((2*n_f+\lfloor(n_f \mod 8)2\rfloor) \mod 4)$, wherein $n_f$ stands for the SFN.

Thus, among 5 continuous subframes of system frames with odd SFNs beginning with a subframe numbered 5, 4 time-sequenced subframes can be found with an RV sequence as $S_{RV}(0), S_{RV}(1), S_{RV}(2), S_{RV}(3)$. An eNB may schedule these subframes to retransmit SI-x messages. Because of the difference in RVs, the performance of retransmission is improved.

Figure 5:
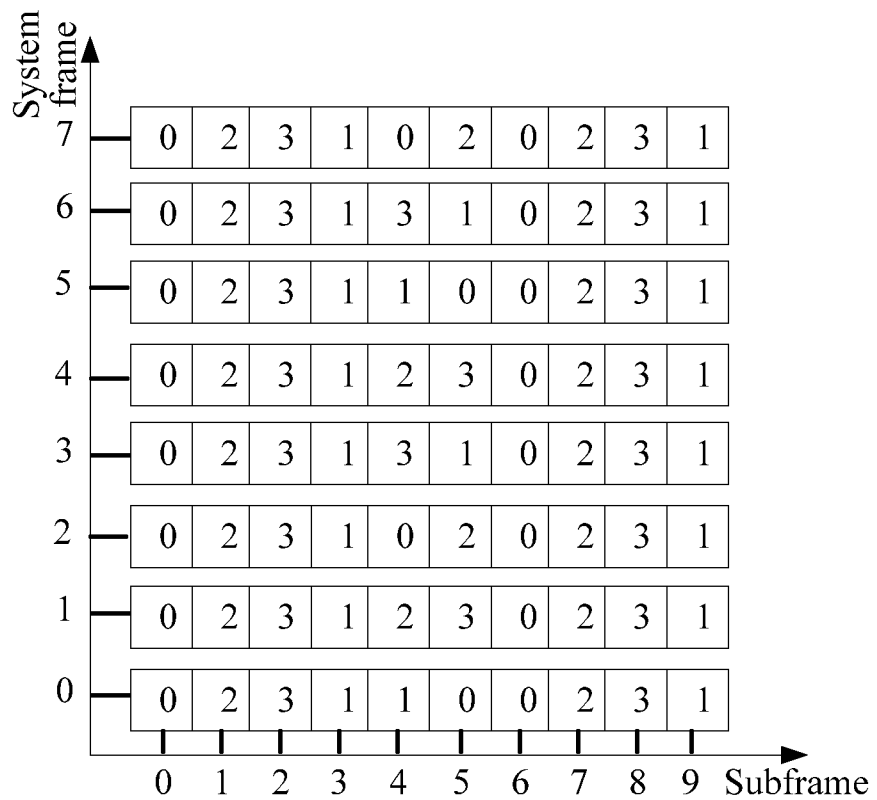
FIG. 5 shows an exemplary of RV sequence of subframes in a method for binding RVs with an SFN and subframe numbers according to an embodiment of the present invention.

After the above steps, RV values of subframes in each system frame are obtained as shown in FIG. 5.

According to the method for binding RVs with an SFN and subframe numbers in the embodiment of the present invention, with respect to any 5 continuous subframes beginning with a subframe numbered 0 or 5, among subframes that are not used by SIB1, 4 time-sequenced subframes can be found with an RV sequence as $S_{RV}(0), S_{RV}(1), S_{RV}(2), S_{RV}(3)$. This facilitates the resource scheduling of an eNB when a transmission window of an SI-x message is 5 ms and therefore improves the performance of retransmission of SI-x messages.

Further, in every 2 continuous system frames beginning with a system frame numbered 0, every 5 continuous subframes are put into one group to get 4 subframe groups. In a subframe group, 4 time-sequenced subframes can be found; these subframes are not used for transmitting SIB1 messages and an RV sequence of these subframes is $S_{RV}(0)$, $S_{RV}(1)$, $S_{RV}(2)$, $S_{RV}(3)$.

Because of the even distribution in time and 4 groups available for scheduling, the scheduling flexibility of an eNB is enhanced and good time diversity can be obtained. This will facilitate the resource scheduling of the eNB when a transmission window of an SI-x message is longer than 5 ms and improve the performance of the retransmission of SI-x messages.

Further, within an 80-ms cycle, an RV sequence of a subframe numbered 5 of system frames with even SFNs in 8 system frames is $S_{RV}(0)$, $S_{RV}(1)$, $S_{RV}(2)$, $S_{RV}(3)$. This guarantees available resources for scheduling in an eNB for SIB1 transmission.

Figure 6:
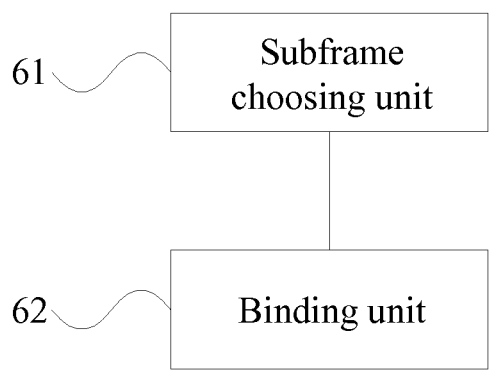
FIG. 6 shows a simplified structure of an apparatus for binding RVs with an SFN and subframe numbers according to an embodiment of the present invention.

In an embodiment of the present invention an apparatus for binding RVs with an SFN and subframe numbers is provided. As shown in FIG. 6, the apparatus includes a subframe choosing unit 61 and a binding unit 62.

The subframe choosing unit 61 is configured to choose any 5 continuous subframes within a transmission window of an SI-x message according to subframe numbers of an SFN. The binding unit 62 is configured to bind the RVs of the SI-x message with the SFN and subframe numbers of the any 5 continuous subframes.

With the apparatus provided according to the embodiment of the present invention, RVs are bound with an SFN and subframe numbers. When a transmission window of an SI-x message is longer than or equal to 5 ms, the performance of retransmission of the SI-x message is assured.

Figure 7:
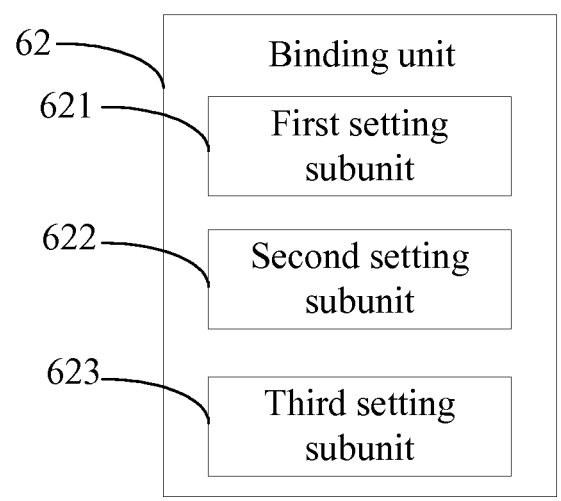
FIG. 7 shows a simplified structure of an apparatus for binding RVs with an SFN and subframe numbers according to another embodiment of the present invention.

Further, as shown in FIG. 7, the binding unit 62 may include: a first setting subunit 621, a second setting subunit 622 and a third setting subunit 623.

The first setting subunit 621 is configured to set an RV sequence of 4 time-sequenced subframes in the 5 continuous subframes as $S_{RV}(0)$, $S_{RV}(1)$, $S_{RV}(2)$, $S_{RV}(3)$ and to set an RV of a remaining subframe in the 5 continuous subframes as any value in $S_{RV}(0)$, $S_{RV}(1)$, $S_{RV}(2)$, $S_{RV}(3)$, wherein none of subframe numbers of the 5 continuous subframes beginning with a subframe numbered N is 5, and N is an integer from 0 to 9.

The second setting subunit 622 is configured to set an RV sequence of 4 subframes in the 5 continuous subframes other than a subframe numbered 5 as $S_{RV}(0)$, $S_{RV}(1)$, $S_{RV}(2)$, $S_{RV}(3)$, and to set an RV of the subframe numbered 5 as $S_{RV} = (\lfloor (n_f \bmod 8)/2 \rfloor)$, where $n_f$ stands for the SFN and $S_{RV} = \{S_{RV}(0), S_{RV}(1), S_{RV}(2), S_{RV}(3)\}$, wherein one subframe number of the 5 continuous subframes beginning with a subframe numbered N is 5 and the SFN is even.

The third setting subunit 623 is configured to set an RV sequence of 4 time-sequenced subframes in the 5 continuous subframes as $S_{RV}(0)$, $S_{RV}(1)$, $S_{RV}(2)$, $S_{RV}(3)$, and to set an RV of a remaining subframe in the 5 continuous subframes as any value in $S_{RV}(0)$, $S_{RV}(1)$, $S_{RV}(2)$, $S_{RV}(3)$, wherein one subframe number of the 5 continuous subframes beginning with subframe numbered N is 5 and the SFN is odd.

The specific binding procedure is described in the method embodiments and is omitted here.

With the apparatus provided according to the embodiment of the present invention, with respect to any 5 continuous subframes beginning with a subframe numbered 0 or 5, among subframes that are not used by SIB1, 4 time-sequenced subframes can be found with an RV sequence as $S_{RV}(0)$, $S_{RV}(1)$, $S_{RV}(2)$, $S_{RV}(3)$. This facilitates the resource scheduling of an eNB when the transmission window of SI-x is 5 ms and therefore improves the performance of retransmission of SI-x messages.

Based on the descriptions of the foregoing embodiments, those skilled in art can be clear that the embodiments of the present invention can be implemented by hardware or implemented by software on a necessary general hardware platform. Based on such understanding, the technical solution of the present invention may be embodied in software. The software may be stored in a nonvolatile storage medium such as a CD-ROM, a USB disk, or a mobile disk. The software includes a number of instructions that enable a computer device (which may be a personal computer, a server or a network device) to execute the method according to the embodiments of the present invention.

Although the invention has been described through exemplary embodiments, the invention is not limited to such embodiments. It is apparent that those skilled in the art can make various modifications and variations to the invention without departing from the spirit and scope of the present invention. The invention is intended to cover the modifications and variations provided that they fall in the scope of protection defined by the claims or their equivalents.

What is claimed is:

1. A method for setting a redundancy version (RV) value of a system information message, comprising:
    setting, by an enhanced Node-B (eNB), a RV value of the system information message in a first subframe as 0; setting, by the eNB, a RV value of the system information message in a second subframe as 2; setting, by the eNB, a RV value of the system information message in a third subframe as 3; and setting, by the eNB, a RV value of the system information message in a fourth subframe as 1; wherein the first subframe, the second subframe, and third subframe and the fourth subframe are four continuous subframes in a transmission window of the system information message;
    transmitting, by the eNB, the system information message within the transmission window.

2. The method according to claim 1, wherein none of the first subframe number, the second subframe number, the third subframe number and the fourth subframe number is equal to 5.

3. The method according to claim 2, wherein a subframe number of the first subframe is 0, a subframe number of the second subframe is 1, a subframe number of the third subframe is 2, a subframe number of the fourth subframe is 3.

4. The method according to claim 2, wherein the method further comprising:
    setting, by the eNB, a RV value of the system information message in the fifth subframe as any one of the following: 0, 2, 3 and 1, wherein the fifth subframe is a continuous subframe after the fourth subframe.

5. The method according to claim 1, wherein one of the first subframe number, the second subframe number, the third subframe number and the fourth subframe number is equal to 5, and an associated System Frame Number (SFN) number is odd.

6. The method according to claim 5, wherein a subframe number of the first subframe is 5, a subframe number of the second subframe is 6, a subframe number of the third subframe is 7, a subframe number of the fourth subframe is 8.

7. The method according to claim 5, wherein the method further comprising:
    setting, by the eNB, a RV value of the system information message in the fifth subframe as any one of the following: 0, 2, 3 and 1, wherein the fifth subframe is a continuous subframe after the fourth subframe.

8. The method according to claim 1, wherein the length of the transmission window is any one of 5ms, 10ms, 20ms and 40ms.

9. The method according to claim 1, wherein a subframe number of the first subframe is 0 within the transmission window of the system information message, a subframe number of the second subframe is 1 within the transmission window of the system information message, a subframe number of the third subframe is 2 within the transmission window of the system information message, a subframe number of the fourth subframe is 3 within the transmission window of the system information message.

10. An enhanced Node-B (eNB), comprising a processor, wherein the processor is configured to:
set a RV value of the system information message in a first subframe as 0,
set a RV value of the system information message in a second subframe as 2;
set a RV value of the system information message in a third subframe as 3;
set a RV value of the system information message in a fourth subframe as 1; wherein the first subframe, the second subframe, and third subframe and the fourth subframe are four continuous subframes in a transmission window of the system information message;
a transmitter, configured to transmit the system information message within the transmission window.

11. The eNB according to claim 10, wherein none of the first subframe number, the second subframe number, the third subframe number and the fourth subframe number is equal to 5.

12. The eNB according to claim 10, wherein a subframe number of the first subframe is 0, a subframe number of the second subframe is 1, a subframe number of the third subframe is 2, a subframe number of the fourth subframe is 3.

13. The eNB according to claim 11, wherein the processor is further configured to set a RV value of the system information message in a fifth subframe as any one of the following: 0, 2, 3 and 1, wherein the fifth subframe is a continuous subframe after the fourth subframe.

14. The eNB according to claim 10, wherein one of the first subframe number, the second subframe number, the third subframe number and the fourth subframe number is equal to 5, and an associated System Frame Number (SFN) number is odd.

15. The eNB according to claim 14, wherein a subframe number of the first subframe is 5, a subframe number of the second subframe is 6, a subframe number of the third subframe is 7, a subframe number of the fourth subframe is 8.

16. The eNB according to claim 14, wherein the processor is further configured to set a RV value of the system information message in the fifth subframe as any one of the following: 0, 2, 3 and 1, wherein the fifth subframe is a continuous subframe after the fourth subframe.

17. The eNB according to claim 10, wherein the length of the transmission window is any one of 5 ms, 10 ms, 20 ms and 40 ms.

18. The eNB according to claim 10, wherein a subframe number of the first subframe is 0 within the transmission window of the system information message, a subframe number of the second subframe is 1 within the transmission window of the system information message, a subframe number of the third subframe is 2 within the transmission window of the system information message, a subframe number of the fourth subframe is 3 within the transmission window of the system information message.

19. A method for setting a redundancy version (RV) value of a system information message, comprising:
setting, by an user equipment (UE), a RV value of the system information message in a first subframe as 0;
setting, by the UE a RV value of the system information message in a second subframe as 2; setting, by the UE, a RV value of the system information message in a third subframe as 3; and setting, by the UE, a RV value of the system information message in a fourth subframe as 1; wherein the first subframe, the second subframe, and third subframe and the fourth subframe are four continuous subframes in a transmission window of the system information message;
receiving, by the UE, the system information message within the transmission window.

20. The method according to claim 19, wherein none of the first subframe number, the second subframe number, the third subframe number and the fourth subframe number is equal to 5.

21. The method according to claim 20, wherein a subframe number of the first subframe is 0, a subframe number of the second subframe is 1, a subframe number of the third subframe is 2, a subframe number of the fourth subframe is 3.

22. The method according to claim 20, wherein the method further comprising:
setting, by the UE, a RV value of the system information message in the fifth subframe as any one of the following: 0, 2, 3 and 1, wherein the fifth subframe is a continuous subframe after the fourth subframe.

23. The method according to claim 19, wherein one of the first subframe number, the second subframe number, the third subframe number and the fourth subframe number is equal to 5, and an associated System Frame Number (SFN) number is odd.

24. The method according to claim 23 wherein a subframe number of the first subframe is 5, a subframe number of the second subframe is 6, a subframe number of the third subframe is 7, a subframe number of the fourth subframe is 8.

25. The method according to claim 23, wherein the method further comprising:
setting, by the UE, a RV value of the system information message in the fifth subframe as any one of the following: 0, 2, 3 and 1, wherein the fifth subframe is a continuous subframe after the fourth subframe.

26. The method according to claim 19, wherein the length of the transmission window is any one of 5 ms, 10 ms, 20 ms and 40 ms.

27. The method according to claim 19, wherein a subframe number of the first subframe is 0 within the transmission window of the system information message, a subframe number of the second subframe is 1 within the transmission window of the system information message, a subframe number of the third subframe is 2 within the transmission window of the system information message, a subframe number of the fourth subframe is 3 within the transmission window of the system information message.

28. A user equipment (UE), comprising a processor, wherein the processor is configured to:
set a RV value of the system information message in a first subframe as 0,
set a RV value of the system information message in a second subframe as 2;
set a RV value of the system information message in a third subframe as 3;

set a RV value of the system information message in a fourth subframe as 1; wherein the first subframe, the second subframe, and third subframe and the fourth subframe are four continuous subframes in a transmission window of the system information message;

a receiver, configured to receive the system information message within the transmission window.

29. The UE according to claim 28, wherein none of the first subframe number, the second subframe number, the third subframe number and the fourth subframe number is equal to 5.

30. The UE according to claim 29, wherein a subframe number of the first subframe is 0, a subframe number of the second subframe is 1, a subframe number of the third subframe is 2, a subframe number of the fourth subframe is 3.

31. The UE according to claim 30, wherein the processor is further configured to set a RV value of the system information message in a fifth subframe as any one of the following: 0, 2, 3 and 1, wherein the fifth subframe is a continuous subframe after the fourth subframe.

32. The UE according to claim 30 wherein one of the first subframe number, the second subframe number, the third subframe number and the fourth subframe number is equal to 5, and an associated System Frame Number (SFN) number is odd.

33. The UE according to claim 32, wherein a subframe number of the first subframe is 5, a subframe number of the second subframe is 6, a subframe number of the third subframe is 7, a subframe number of the fourth subframe is 8.

34. The UE according to claim 32, wherein the processor is further configured to set a RV value of the system information message in the fifth subframe as any one of the following: 0, 2, 3 and 1, wherein the fifth subframe is a continuous subframe after the fourth subframe.

35. The UE according to claim 28, wherein the length of the transmission window is any one of 5 ms, 10 ms, 20 ms and 40 ms.

36. The UE according to claim 28, wherein a subframe number of the first subframe is 0 within the transmission window of the system information message, a subframe number of the second subframe is 1 within the transmission window of the system information message, a subframe number of the third subframe is 2 within the transmission window of the system information message, a subframe number of the fourth subframe is 3 within the transmission window of the system information message.

* * * * *